(12) United States Patent
Huang et al.

(10) Patent No.: US 12,540,225 B2
(45) Date of Patent: Feb. 3, 2026

(54) POLYMER COMPOSITION AND EXPANDED POLYPROPYLENE BEADS MADE FROM THE POLYMER COMPOSITION

(71) Applicant: SABIC GLOBAL TECHNOLOGIES B.V., Bergen op Zoom (NL)

(72) Inventors: Ting Huang, Geleen (NL); Chaodong Jiang, Geleen (NL); Christelle Marie Helene Grein, Geleen (NL); Martin Antonius Van Es, Geleen (NL); Mark Leo Hendrik Theunissen, Geleen (NL); Johan Maria Krist, Geleen (NL); Liang Wen, Geleen (NL); Yijie Chen, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 763 days.

(21) Appl. No.: 17/627,403

(22) PCT Filed: Jul. 17, 2020

(86) PCT No.: PCT/EP2020/070276
§ 371 (c)(1),
(2) Date: Jan. 14, 2022

(87) PCT Pub. No.: WO2021/013723
PCT Pub. Date: Jan. 28, 2021

(65) Prior Publication Data
US 2022/0259397 A1    Aug. 18, 2022

(30) Foreign Application Priority Data

Jul. 19, 2019 (CN) .................. 201910654652.X
Mar. 3, 2020 (EP) ................................... 20160761

(51) Int. Cl.
| | | |
|---|---|---|
| C08J 9/16 | (2006.01) | |
| C08J 9/232 | (2006.01) | |
| C08L 23/14 | (2006.01) | |
| C08L 23/16 | (2006.01) | |

(52) U.S. Cl.
CPC ............... C08J 9/16 (2013.01); C08J 9/232 (2013.01); C08L 23/14 (2013.01); C08L 23/16 (2013.01); C08J 2323/14 (2013.01)

(58) Field of Classification Search
CPC ....................................................... C08J 9/16
See application file for complete search history.

(56) References Cited

U.S. PATENT DOCUMENTS

| | | | | |
|---|---|---|---|---|
| 4,990,554 | A * | 2/1991 | Nomura .................. | C08L 53/00 524/436 |
| 6,607,682 | B1 * | 8/2003 | Yamaguchi ........... | B29C 44/445 264/126 |
| 7,687,588 | B2 * | 3/2010 | Mei ........................ | C08F 210/06 526/901 |
| 2005/0090571 | A1 | 4/2005 | Mehta et al. | |
| 2009/0156700 | A1 * | 6/2009 | Oikawa ..................... | C08J 9/18 521/143 |
| 2011/0034649 | A1 * | 2/2011 | Standaert ................ | C08F 10/06 526/124.3 |
| 2016/0009887 | A1 * | 1/2016 | Fukuzawa .............. | C08J 9/0061 521/144 |

FOREIGN PATENT DOCUMENTS

| | | |
|---|---|---|
| EP | 1036814 B1 | 12/1998 |
| EP | 2208751 A1 | 9/2008 |
| EP | 2487199 B1 | 9/2010 |

OTHER PUBLICATIONS

Spherizone flyer (Year: NA).*
International Search Report Written Opinion; International Application No. PCT/EP2020/070276; International Filing Date: Jul. 17, 2020; Date of Mailing: Oct. 15, 2020; 12 pages.
Muller et al., Successive Self-nucleation/Annealing (SSA): A Novel Technique to Study Molecular Segregation During Crystallization, 1997, Polymer Bulletin vol. 39, pp. 465-472.
Written Opinion; International Application No. PCT/EP2020/070276; International Filing Date: Jul. 17, 2020; Date of Mailing: Oct. 15, 2020; 12 pages.

* cited by examiner

*Primary Examiner* — Irina Krylova
(74) *Attorney, Agent, or Firm* — CANTOR COLBURN LLP

(57) ABSTRACT

The present invention relates to a polymer composition comprising (85-100 wt %) of a propylene copolymer based on the total amount of the polymer composition, wherein the comonomer in the propylene copolymer is selected from moiety derived from ethylene, an α-olefin having (4) to (20) carbon atoms or a combination thereof, wherein the amount of the comonomer is in the range of (0.50 to 4.5) wt % based on the propylene copolymer, wherein the fraction of melted propylene copolymer in the temperature range from (116 to 151° C.) is in the range from (65 to 90) wt % based on the total weight of the propylene copolymer. The present invention also relates to expanded polypropylene (EPP) beads comprising said polymer composition. The invention further relates to the use of such EPP beads. The invention further relates to a process for preparing such EPP beads. The present invention also relates to an article made from said EPP beads. The invention further relates to the use of such article. The invention further relates to a process for preparing such article.

6 Claims, 1 Drawing Sheet

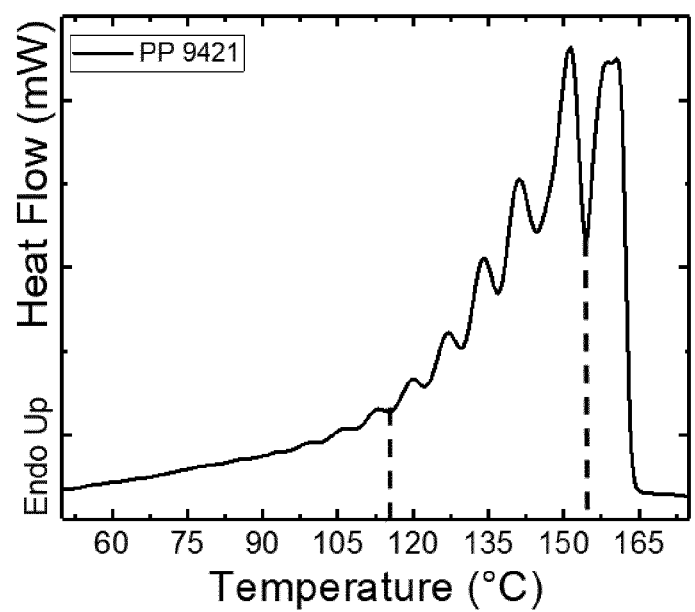

POLYMER COMPOSITION AND EXPANDED POLYPROPYLENE BEADS MADE FROM THE POLYMER COMPOSITION

CROSS REFERENCE TO RELATED APPLICATIONS

This application is a National Stage application of PCT/EP2020/070276, filed Jul. 17, 2020, which claims the benefit of European Application No. 20160761.1, filed Mar. 3, 2020, and Chinese Application No. 201910654652.X, filed Jul. 19, 2019, all of which are incorporated by reference in their entirety herein.

The present invention relates to a polymer composition comprising a propylene copolymer. The invention further relates to the use of such polymer composition. The invention further relates to processes for preparing such polymer composition.

The present invention also relates to expanded polypropylene (EPP) beads comprising said polymer composition. The invention further relates to the use of such EPP beads. The invention further relates to a process for preparing such EPP beads.

The present invention also relates to an article made from said EPP beads. The invention further relates to the use of such article. The invention further relates to a process for preparing such article.

EPP beads are foamed particles. They can be produced with polypropylene pellets in an autoclave process where pellets are foamed into EPP beads. The shape of both polypropylene pellets and EPP beads is quasi-spherical. The diameter of polypropylene pellets is in the range from 0.5 to 1.5 mm while the diameter of EPP beads is in the range of 1.0 to 5.5 mm. The degree of foaming can be described by foaming ratio which is the volume ratio between the EPP beads and polypropylene pellets prior to foaming. EPP beads can be used to produce an article in a steam molding process.

Steam molded articles made from EPP beads are known for use in various fields such as automobile, building, furniture and toy thanks to their unique combination of properties e.g. light weight, excellent heat insulation, good chemical resistance and high impact resistance.

EP1036814B1 discloses EPP beads comprising a propylene copolymer produced with metallocene polymerization catalyst which has a melting point exceeding 140° C. and a melt flow rate of 12 g/10 minutes or lower. EP1036814B1 mentions EPP beads comprising such propylene copolymer have good moldability.

EP2487199B1 discloses that by making EPP beads from, as a base material resin, a polypropylene resin which had at least two melting peaks on a DSC curve obtained by the measurements of melting points with use of a differential scanning calorimeter (DSC), the at least two melting peaks including (i) a lowest-temperature melting peak of 100° C. or more but 130° C. or less and (ii) a highest-temperature melting peak of 140° C. or more but 160° C. or less, it was possible to obtain EPP beads which (i) could produce an in-mold foaming molded product at a very low mold heating steam pressure, (ii) exhibited low distortion, low shrinkage, and a wide range of heating condition for molding, even if the mold heating steam pressure was increased, (iii) indicated a satisfactory moldability in a case where the expanded particles were molded using a mold having a complicated shape, a large mold, or the like, and (iv) maintain its properties such as compressive strength, without being impaired largely, in a case where the EPP beads prepare a polypropylene resin in-mold foaming molded product.

US20050090571A1 discloses an expanded olefin resin comprising a copolymer base resin and a blowing agent, wherein the copolymer base resin is comprised of about 90 to 99.999 weight percent of an olefin and about 0.001 to 10 weight percent of an α-ω diene, wherein the copolymer base resin has a weight average molecular weight of about 30,000 to 500,000 Daltons, a crystallization temperature in a range from 115° C. to 135° C., and a melt flow rate in a range from 0.1 dg/min to 100 dg/min as determined using ASTM D-1238 at 230° C. and 2.16 kg load. It was found that such resin has improved physical, mechanical and rheological properties according US20050090571A1.

It is known that the production process of EPP beads usually requires high standard of temperature control as even 0.5° C. of temperature deviation could lead to a difference of foaming ratio of 10. In practice it is technically challenging to keep the temperature fully stable during the EPP beads production process without any temperature fluctuation. Temperature fluctuation could lead to a high defective rate of the final product due to the significant variation of the foaming ratio. From this aspect, it is an object of the present invention to provide a polymer composition with stable foaming ratio over a certain range of temperature.

It is also known that steam molding is an energy consuming process. It is possible to use EPP beads made from a polymer composition with lower melting temperature in the steam molding process to reduce the energy consumption because the temperature setting of the steam molding process can be lower, but this type of polymer composition often leads to lower stiffness of the steam molded article. Therefore, it is a further object of the present invention to provide an article prepared in a steam molding process with reduced energy consumption while keeping the stiffness at the same level.

It has been found by the inventors of the present invention that the aforementioned technical problems are solved by a polymer composition comprising 85-100 wt % of a propylene copolymer based on the total amount of the polymer composition, wherein the comonomer in the propylene copolymer is selected from moiety derived from ethylene, an α-olefin having 4 to 20 carbon atoms or a combination thereof, wherein the amount of the comonomer is in the range of 0.50 to 4.5 wt % based on the propylene copolymer, wherein the fraction of melted propylene copolymer in the temperature range from 116 to 151° C. is in the range from 65 to 90 wt % based on the total weight of the propylene copolymer.

It was surprisingly found that such polymer composition have stable foaming ratio over 1° C. of temperature variation during the EPP beads production process. It was also found that steam molded article produced by the EPP beads made from such polymer composition requires less energy during the molding while maintaining the same level of stiffness.

Propylene Copolymer

In the context of polyolefin industry, there are two well-known categories of propylene copolymer: Propylene random copolymer and heterophasic propylene copolymer. The difference between these two types of propylene copolymer being the former is homogeneous and the latter is heterophasic. For the purpose of the present invention, the propylene copolymer is preferably a propylene random copolymer.

Comonomer

The comonomer in the propylene copolymer is selected from moiety derived from ethylene, an α-olefin having 4 to 20 carbon atoms or a combination thereof.

The amount of comonomer in the propylene copolymer is in the range from 0.50 to 4.5 wt %, preferably 1.0 to 4.4 wt %, preferably 2.0 to 4.3 wt %, preferably 3.0 to 4.2 wt %, preferably 3.6 to 4.1 wt %, preferably 3.7 to 4.0 wt % based on the propylene copolymer.

Preferable the comonomer in the propylene copolymer is moiety derived from ethylene.

Melt Flow Index (MFI)

MFI of the propylene copolymer can be in the range of 5-15 g/10 min, preferably 6-12 g/10 min, preferably 7-10 g/10 min when determined according to ISO1133-1:2011 with 2.16 kg load at 230° C.

Thermal-Mechanical Behavior

The thermal-mechanical behavior of the propylene copolymer is determined by Dynamic Mechanical Analysis (DMA). For the purpose of stable foaming during the EPP beads production process, at 151° C. tan δ of the propylene copolymer can be in the range from 0.160 to 0.080, preferably from 0.155 to 0.090, more preferably from 0.150 to 0.100, more preferably from 0.140 to 0.110, most preferably from 0.135 to 0.115 according to ASTM D4092-07(2013) with the following setting: Oscillatory Temperature Ramp with 17.5 mm Single Cantilever Geometry at 1 Hz, 6% Oscillation strain, temperature ramps from 27 to 160° C. at the rate of 5° C./min.

The DMA test can for example be performed on a TA Instrument DMA 850 machine with sample size of 4*10*40 mm.

Thermal Behavior

The fraction of melted propylene copolymer in the temperature range from 116 to 151° C. is in the range from 65 to 90 wt %, preferably from 68 to 90 wt %, preferably from 70 to 90 wt % based on the total weight of the propylene copolymer.

The fraction of melted propylene copolymer in the temperature range from 116 to 151° C. can be determined by Successive Self-nucleation and Annealing (SSA) measurement.

Successive Self-nucleation and Annealing (SSA) is a methodology for Differential scanning calorimetry (DSC) thermal fractionation, developed by Müller et al. (A. J. Muller, Z. H. Hernandez, M. L. Arnal, J. J. Sanchez; *Successive self-nucleation/annealing (SSA): A novel technique to study molecular segregation during crystallization*; Polym Bulletin, 1997, 39, 465-472). By using this method, the inventors were able to pinpoint the fraction of polymer melted in specific temperature range.

SSA test can be conducted on a DSC machine for example DSC TA Q1000.

For example, the fraction of melted propylene copolymer in the temperature range from 116 to 151° C. can be calculated as the ratio between the melt enthalpy within the range from 116 to 151° C. and the total melt enthalpy, wherein the enthalpy values can be obtained in a test conducted according to ISO 11357-3:2018 using the following temperature setting:
  a) Isothermal 0° C. for 5 minutes.
  b) Heat from 0° C. to 230° C. with a temperature change rate of 10° C./min
  c) Isothermal 230° C. for 5 minutes.
  d) Cool from 230° C. to 25° C. with a temperature change rate of 10° C./min
  e) Isothermal 25° C. for 5 minutes.
  f) Heat from 25° C. to 166° C. with a temperature change rate of 10° C./min
  g) Isothermal 166° C. for 5 minutes.
  h) Cool from 166° C. to 25° C. with a temperature change rate of 10° C./min
  i) Isothermal 25° C. for 5 minutes.
  j) Heat from 25° C. to 161° C. with a temperature change rate of 10° C./min
  k) Isothermal 161° C. for 5 minutes.
  l) Cool from 161° C. to 25° C. with a temperature change rate of 10° C./min
  m) Isothermal 25° C. for 5 minutes.
  n) Step from i) to m) are repeated in the subsequent loops by lowering of the step size by 5° C. every time, using an isothermal time of 5 minutes until 41° C. is reached.

Alternatively, the fraction of melted propylene copolymer in the temperature range from 116 to 151° C. can be calculated as the ratio between the area in-between the heat flow-temperature curve and the temperature axis in the range from 116 to 151° C. and the total area in-between the heat flow-temperature curve and the temperature axis, wherein the heat flow-temperature curve can be obtained in a test conducted according to ISO 11357-3:2018 using the following temperature setting:
  a) Isothermal 0° C. for 5 minutes.
  b) Heat from 0° C. to 230° C. with a temperature change rate of 10° C./min
  c) Isothermal 230° C. for 5 minutes.
  d) Cool from 230° C. to 25° C. with a temperature change rate of 10° C./min
  e) Isothermal 25° C. for 5 minutes.
  f) Heat from 25° C. to 166° C. with a temperature change rate of 10° C./min
  g) Isothermal 166° C. for 5 minutes.
  h) Cool from 166° C. to 25° C. with a temperature change rate of 10° C./min
  i) Isothermal 25° C. for 5 minutes.
  j) Heat from 25° C. to 161° C. with a temperature change rate of 10° C./min
  k) Isothermal 161° C. for 5 minutes.
  l) Cool from 161° C. to 25° C. with a temperature change rate of 10° C./min
  m) Isothermal 25° C. for 5 minutes.
  n) Step from i) to m) are repeated in the subsequent loops by lowering of the step size by 5° C. every time, using an isothermal time of 5 minutes until 41° C. is reached.

For the purpose of illustration of this alternative method, SSA result of commercial available SABIC PP 9421 is shown in FIG. 1. The total area under the whole heat flow curve is Y J/g and the area under the heat flow curve between 115° C. and 155° C. (dashed lines) is X J/g, then the fraction of melted SABIC PP 9421 between 115° C. and 155° C. can be calculated as X/Y.

Catalyst

The catalyst to produce propylene copolymer is also know in the art, for example Ziegler-Natta catalyst, metallocene catalyst. Preferably the catalyst used to produced the polypropylene of the present invention is free of phthalate, for example the catalyst comprises compounds of a transition metal of Group 4 to 6 of IUPAC, a Group 2 metal compound and an internal donor wherein said internal donor is a compound selected from optionally substituted malonates, maleates, succinates, glutarates, cyclohexene-1,2-dicarboxylates, benzoates and derivatives and/or mixtures thereof, preferably the internal donor is a citraconate.

Process to Prepare Propylene Copolymer

The process to produce propylene copolymer is known in the art such as bulk polymerization, gas phase polymerization, slurry polymerization, solution polymerization or any combination thereof. Preferably the polypropylene of the present invention is produced in a sequential polymerization process comprising at least two reactors, more preferably the polypropylene of the present invention is produced in a sequential polymerization process comprising at least three reactors.

Polymer Composition

The polymer composition according to the present invention comprises 85-100 wt % of the aforementioned propylene copolymer based on the total amount of the polymer composition.

Besides of the propylene copolymer, the polymer composition may further comprise additives. The additives may include stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; external elastomeric impact modifiers; blowing agents; inorganic fillers such as talc and reinforcing agents; and/or components that enhance interfacial bonding between polymer and filler, such as a maleated polypropylene. The amount of the additives depends on their type and function and is in the range from 0 to 15 wt % based on the total amount of the polymer composition.

In an embodiment, the polymer composition comprises an agent which is able to improve the thermal conductivity of the polymer composition, the agent can for example be carbon black.

It is preferred that the polymer composition according to the invention has high tenacity, preferably strain at break of the propylene copolymer is from 500 to 5000% when determined according to IS0527-1 (2012).

Process to Prepare Polymer Composition

The polymer composition can be prepared by compounding the propylene copolymer and additives in an extrusion step. The setting of extruder to prepare the polymer composition is known by the person skilled in art. The polymer composition obtained in this process is in pellet form, wherein of the shape of the pellets of the polymer composition is quasi-spherical, wherein the diameter of the polymer composition is in the range from 0.5 to 1.5 mm.

EPP Beads

EPP beads can be produced by placing the pellets of the polymer composition in a pressurized sealed container such as an autoclave and dispersing them in an aqueous medium. A dispersing agent can be added if needed.

Then the required amount of the foaming agent is supplied to the sealed container, and the mixture is stirred under pressure and heated to let the foaming agent impregnate the pellets of the polymer composition.

After the impregnation of the pellets of the polymer composition by the foaming agent, the temperature and the pressure of the sealed container are lowered optionally to room temperature and to atmosphere level gradually to allow the pellets to be foamed into EPP beads.

The aqueous medium is usually water, the mass ratio between pellets of the polymer composition and the aqueous medium is in the range from 1:5 to 5:1, preferably from 1:3 to 3:1, most preferably from 1:2 to 2:1.

The optional dispersing agent can be inorganic materials such as alumina, tricalcium phosphate, magnesium pyrophosphate, zinc oxide, kaolin, and mica, which are poorly soluble in water or polyvinylpyrrolidone, polyvinyl alcohol, and methylcellulose which are protective colloid agents based on water soluble polymer. Further, an anionic surfactant such as sodium dodecylbenzenesulfonate or sodium alkanesulfonate can be used as a dispersing agent.

Foaming agent used in the present invention is a physical foaming agent, for example an organic physical foaming agent such as a halogenated hydrocarbon, ethane or dichloromethane, or an inorganic gas such as carbon dioxide, nitrogen or air, or a mixture thereof. Among these foaming agents, inert gas such as carbon dioxide, nitrogen or air as a main component is preferably used. Most preferably, the foaming agent is carbon dioxide. The amount of the foaming agent is adjustable according to the volume of the container, the mass ratio between the polymer composition and the aqueous medium, the temperature and the pressure setting of the container.

For the purpose of the present invention, during impregnation step the temperature inside the pressurized sealed container is in the range from 140 to 165° C., preferably 145 to 160° C., preferably 148 to 157° C., preferably 149 to 155° C. For example, the temperature inside the pressurized sealed container is 151° C. during the impregnation step. Person skilled in art is capable to tune the temperature to obtain the EPP beads with desired foaming ratio.

The pressure inside the pressurized sealed container during the impregnation step is in the range from 0.5 to 6.0 MPa, preferably from 1.5 to 5.0 MPa. Person skilled in art is capable to tune the pressure to obtain the EPP beads with desired foaming ratio.

Typical duration of the impregnation step is in the range from 10 to 60 min. Person skilled in art is capable to tune the impregnation duration to obtain the EPP beads with desired foaming ratio.

For example, process for the preparation of EPP beads comprising the steps in the following order:
  providing the aforementioned polymer composition
  placing the aforementioned polymer composition and water in a pressurized sealed container, wherein the mass ratio between the polymer composition and water is in the range from 1:5 to 5:1
  heating the container to a temperature range from 140 to 165° C. and injecting required amount of inert gas such as carbon dioxide, nitrogen or air into the container to reach a pressure range from 0.5 to 6.0 MPa.
  maintaining the temperature and pressure for a duration in the range from 10 to 60 min once the target temperature and pressure are reached
  discharging the container to room temperature 25° C. and atmosphere level of pressure 1 bar
  taking EPP beads from the container and drying the EPP beads.

For example, process for the preparation of EPP beads comprising the steps in the following order:
  providing the aforementioned polymer composition
  placing the aforementioned polymer composition and water in a pressurized sealed container, wherein the mass ratio between the polymer composition and water is in the range from 1:3 to 3:1
  heating the container to a temperature range from 149 to 155° C. and injecting required amount of carbon dioxide into the container to reach a pressure range from 1.5 to 5.0 MPa.
  maintaining the temperature and pressure for a duration in the range from 10 to 60 min once the target temperature and pressure are reached
  discharging the container to room temperature 25° C. and atmosphere level of pressure 1 bar taking EPP beads from the container and drying the EPP beads.

Density of the pellets of the polymer composition and of EPP beads is tested according to ISO845: 2006. The foaming ratio is calculated as the ratio between the density of the pellets of the polymer composition and that of EPP beads produced from thereof. Typical foaming ratio of EPP beads is in the range from 10 to 50.

The EPP beads according to the present invention comprise 95 to 100 wt % of the aforementioned polymer composition.

The invention further relates to the use of the EPP beads for the preparation of steam molded articles.

Steam Molded Article

Steam molded article are prepared in a process with the following steps:
providing the aforementioned EPP beads
steam molding the EPP beads into the article by placing the EPP beads in a mold and fuse-bonding them, wherein the temperature range of this step is from 130° C. to 150° C., wherein the pressure range of this step is from the 2.7 to 4.5 MPa, wherein the duration of this step is in the range from 5 to 20 min.

The invention also relates to a steam molded article prepared with the aforementioned EPP beads.

The invention further relates to the use of the steam molded article for automobile, building construction and toy applications.

The invention further relates to the use of the aforementioned polymer composition for EPP beads production with stable foaming ratio or for reduction of energy consumption in the steam molding process using the EPP beads produced from the polymer composition.

EXAMPLES

Material

Polymer Composition 1: Polymer Composition 1 comprises 100 wt % of a polypropylene random copolymer produced in Sperizone technology with a Ziegler-Natta catalyst. The comonomer in Polymer Composition 1 is moiety derived from ethylene. The amount of moiety derived from ethylene is 3.80 wt % based on the total amount of Polymer Composition 1.

Polymer Composition 2: Polymer Composition 2 comprises 100 wt % of a polypropylene random copolymer available from The Polyolefin Company (Singapore) with commercial name COSMOPLENE® W331. The comonomer in Polymer Composition 2 is moiety derived from ethylene. The amount of moiety derived from ethylene is 3.00 wt % based on the total amount of Polymer Composition 2.

Both Polymer Compositions were provided in pellet form of quasi-spherical shape, the diameter of their pellets is in the range from 0.5 to 1.5 mm.

Sample Preparation

Injection Molding

Pellets of polymer compositions were injection molded into specimens of dimensions 4*10*40 mm to be used in DMA test according to ASTM D4092-07(2013) and specimens of shapes according to ISO527-1A (2012) to be used in tensile test.

EPP Preparation 25 kg of Polymer Composition pellets was placed in an autoclave with interior volume of 150 L together with 25 kg water. Then the autoclave was sealed and heated, $CO_2$ was injected in the autoclave to maintain the pressure at 3 MPa at the temperature setting indicated in Table 1. Once the temperature and pressure reached the target level, they were maintained for 20 min for $CO_2$ to impregnate Polymer Composition pellets. Afterwards, the autoclave was discharged to atmosphere pressure 1 Bar and room temperature 25° C. During the discharge of the autoclave, Polymer Composition pellets were expanded into EPP beads. In the end, the EPP beads were taken out of the autoclave and dried.

TABLE 1

|  | EPP Production | | |
| --- | --- | --- | --- |
|  | 1 | 2 | 3 |
| Temperature (° C.) | 149.5 | 150 | 150.5 |

Steam Molded Article Preparation

EPP beads produced from Polymer Composition 1 and 2 with foaming ratio 25 were steam molded under the condition in table 2 for 10 min into an article with dimensions 50×50×5 cm.

TABLE 2

|  | Polymer Composition 1 | Polymer Composition 2 |
| --- | --- | --- |
| Temperature (° C.) | 142 | 145 |
| Pressure (MPa) | 3.83 | 4.16 |

Testing Method

MFI

MFI of the pellets of the Polymer Compositions were tested according to ISO1133-1:2011 with 2.16 kg load at 230° C.

Strain at Break

Strain at break were tested in a tensile test according to ISO527-1(2012) on the injection molded specimens of the Polymer Compositions Thermal-Mechanical Test DMA measurement according to ASTM D4092-07(2013) was conducted with the following setting: Oscillatory Temperature Ramp with 17.5 mm Single Cantilever Geometry at 1 Hz, 6% Oscillation strain, temperature ramps from 27 to 160° C. at the rate of 5° C./min on a TA Instrument DMA 850 machine with injection molded specimens. tan δ at 151° C. of the Polymer Compositions was obtained in this test.

Thermal Behavior

Fraction of Polymer Compositions melted in the range between 116 to 151° C. was measured by SSA following the protocol of ISO 11357-3:2018 with the following temperature setting:
a) Isothermal 0° C. for 5 minutes.
b) Heat from 0° C. to 230° C. with a temperature change rate of 10° C./min
c) Isothermal 230° C. for 5 minutes.
d) Cool from 230° C. to 25° C. with a temperature change rate of 10° C./min
e) Isothermal 25° C. for 5 minutes.
f) Heat from 25° C. to 166° C. with a temperature change rate of 10° C./min
g) Isothermal 166° C. for 5 minutes.
h) Cool from 166° C. to 25° C. with a temperature change rate of 10° C./min
i) Isothermal 25° C. for 5 minutes.

j) Heat from 25° C. to 161° C. with a temperature change rate of 10° C./min
k) Isothermal 161° C. for 5 minutes.
l) Cool from 161° C. to 25° C. with a temperature change rate of 10° C./min
m) Isothermal 25° C. for 5 minutes.
n) Step from i) to m) are repeated in the subsequent loops by lowering of the step size by 5° C. everytime, using an isothermal time of 5 minutes until 41° C. is reached.

The SSA test was carried out on DSC TA Q1000.

The fraction of Polymer Compositions melted 116 to 151° C. was calculated as the ratio between the melt enthalpy within in the range of 116 to 151° C. and the total melt enthalpy. The enthalpy values were exported directly via the software associated with DSC TA Q1000.

Compression Modulus of Steam Molded Article

Compression modulus of steam molded article was tested according to ISO844: 2014.

Density

Density of the pellets of both Polymer Compositions and EPP beads produced from both Polymer Compositions in EPP production 1, 2 and 3 were tested according to ISO845: 2006.

Result and Discussion

The result of aforementioned test are present in Table 3.

TABLE 3

|  | Polymer Composition 1 | Polymer Composition 2 |
|---|---|---|
| MFI (dg/min) | 8.6 | 6.9 |
| Comonomer content (wt %) | 3.80 | 3.00 |
| Density of pellets (g/cm³) | 0.90 | 0.90 |
| Strain at break (wt %) | 484 | 551 |
| Melt enthalpy 116 to 151° C. (J/g) | 45.8 | 47.9 |
| Total melt enthalpy (J/g) | 73.5 | 67.3 |
| Fraction melted 116 to 151° C. (wt %) | 62.3 | 71.1 |
| Average tan δ at 151° C. | 0.13 | 0.18 |
| Density of EPP beads from EPP Production 1 (g/cm³) | 0.044 | 0.098 |
| Foaming ratio in EPP Production 1 | 20.5 | 9.2 |
| Density of EPP beads from EPP Production 2 (g/cm³) | 0.044 | 0.078 |
| Foaming ratio in EPP Production 2 | 20.5 | 11.5 |
| Density of EPP beads from EPP Production 3 (g/cm³) | 0.043 | 0.067 |
| Foaming ratio in EPP Production 3 | 21.0 | 13.5 |
| Foaming ratio variation with EPP Production 1, 2 and 3 | 0.5 | 4.3 |
| Compression modulus of the steam molded article (MPa) | 2.2 | 2.2 |

According to table 3, a larger fraction of Polymer Composition 1 is melted in the temperature range from 116 to 151° C. than Polymer Composition 2, and Polymer Composition 1 has a lower tan δ value at 151° C. than Polymer Composition 2. As a result, the foaming ratio variation of Polymer Composition 1 is significantly improved comparing to Polymer Composition 2. Moreover, although the steam molding condition of the EPP beads made from Polymer Composition 1 is of lower temperature and pressure than that of the EPP beads made from Polymer Composition 2, the compression modulus of the final steam molded articles based on Polymer Composition 1 and Polymer Composition 2 is the same. It indicates that an article prepared in a steam molding process with reduced energy consumption while keeping the stiffness at the same level is obtained. Furthermore, Polymer Composition 1 shows better tenacity than Polymer Composition 2 with a higher strain at break.

The invention claimed is:

1. A polymer composition comprising: 100 wt % of a propylene copolymer based on the total amount of the polymer composition, wherein a comonomer in the propylene copolymer is selected from moiety derived from ethylene, an α-olefin having 4 to 20 carbon atoms or a combination thereof, wherein the amount of the comonomer is in the range of 3.7 to 4.0 wt % based on the propylene copolymer, wherein the fraction of the polymer composition melted in the temperature range from 116 to 151° C. is in the range from 70 to 90 wt % based on the total weight of the polymer composition; wherein at 151° C. tan δ of the polymer composition is in the range from 0.15 to 0.11 when tested according to ASTM D4092-07 (2013) with the following setting: Oscillatory Temperature Ramp with 17.5 mm Single Cantilever Geometry at 1 Hz, 6% Oscillation strain, temperature ramps from 27 to 160° C. at the rate of 5° C./min, wherein the melt flow index (MFI) of the propylene copolymer is in the range from 8 to 10 g/10 min when determined according to ISO1133-1:2011 with 2.16 kg load at 230° C., and wherein the strain at break of the polymer composition is from 500 to 551% when determined according to ISO527-1(2012).

2. The polymer composition according to claim 1 wherein the comonomer in the propylene copolymer is moiety derived from ethylene.

3. A process for the preparation of expanded polypropylene beads comprising the steps in the following order:
providing the polymer composition of claim 1;
placing the polymer composition of and water in a pressurized sealed container, wherein the mass ratio between the polymer composition and water is in the range from 1:5 to 5:1;
heating the container to a temperature range from 140 to 165° C. and injecting required amount of inert gas such as carbon dioxide, nitrogen or air into the container to reach a pressure range from 0.5 to 6.0 MPa;
maintaining the temperature and pressure for a duration in the range from 10 to 60 min once a target temperature and pressure are reached;
discharging the container to room temperature and atmosphere level of pressure 1 bar; and
taking the expanded polypropylene beads from the container and drying the expanded polypropylene beads.

4. Expanded polypropylene beads comprising 95 to 100 wt % of the polymer composition of claim 1.

5. A steam molded article prepared with the expanded polypropylene beads of claim 4.

6. A process for the preparation of a steam molded article comprising the steps of providing the expanded polypropylene beads of claim 4; and steam molding the expanded polypropylene beads into the article by placing the expanded polypropylene beads in a mold and fuse-bonding them, wherein the temperature range of this step is from 130° C. to 150° C., wherein the pressure range of this step is from the 2.7 to 4.5 MPa, wherein the duration of this step is in the range from 5 to 20 min.

\* \* \* \* \*